United States Patent [19]

Crooks

[11] Patent Number: 5,401,916
[45] Date of Patent: Mar. 28, 1995

[54] METHOD AND APPARATUS FOR CAPTURING HANDWRITTEN INFORMATION AND PROVIDING VISUAL FEEDBACK

[75] Inventor: John F. Crooks, Duluth, Ga.

[73] Assignee: NCR Corporation, Dayton, Ohio

[21] Appl. No.: 953,433

[22] Filed: Sep. 29, 1992

[51] Int. Cl.⁶ ............................................. G08C 21/00
[52] U.S. Cl. .................................................... 178/18
[58] Field of Search ...................... 434/410; 178/18, 19; 382/3; 345/173-179

[56] References Cited

U.S. PATENT DOCUMENTS

| | | | |
|---|---|---|---|
| 1,631,192 | 6/1927 | Dunlap . | |
| 1,881,140 | 10/1932 | Settel . | |
| 2,917,838 | 12/1959 | Neugass | 35/66 |
| 3,152,406 | 10/1964 | Marques | 35/66 |
| 3,443,332 | 5/1969 | Christy | 40/134 |
| 3,761,343 | 9/1973 | Kinberg et al. | 161/6 |
| 3,894,183 | 7/1975 | Barish | 178/18 |
| 3,943,643 | 3/1976 | Fisher et al. | 35/66 |
| 4,143,472 | 3/1979 | Murata et al. | 35/66 |
| 4,317,956 | 3/1982 | Torok et al. | 178/18 |
| 4,346,657 | 8/1982 | Okutsu | 101/269 |
| 4,385,285 | 5/1983 | Horst et al. | 382/3 |
| 4,587,568 | 5/1986 | Takayama et al. | 358/293 |
| 4,797,106 | 1/1989 | Umehara et al. | 434/408 |
| 4,801,266 | 1/1989 | Kinberg | 434/85 |
| 4,803,564 | 2/1989 | Sakai | 358/294 |
| 4,927,748 | 5/1990 | Kimberg | 434/410 |
| 4,931,019 | 6/1990 | Park | 345/173 |
| 4,958,148 | 9/1990 | Olson | 340/712 |
| 4,990,900 | 2/1991 | Kikuchi | 340/712 |
| 5,015,999 | 5/1991 | Imai et al. | 345/75 |
| 5,072,076 | 12/1991 | Camp, Jr. | 178/18 |
| 5,120,906 | 6/1992 | Protheroe et al. | 178/18 |
| 5,223,677 | 6/1993 | Kapp et al. | 178/18 |
| 5,231,381 | 7/1993 | Duwaer | 178/18 |

OTHER PUBLICATIONS

U.S. Patent Application Ser. No. 07/575,096, filed Aug. 30, 1990, Inventors David Allgeier et al., for Write Input Transaction Apparatus and Method.

*Primary Examiner*—Stephen Chin
*Assistant Examiner*—Kevin Kim
*Attorney, Agent, or Firm*—Albert L. Sessler, Jr.

[57] ABSTRACT

A method and apparatus for electronically capturing handwritten information and for providing a visual feedback to the user of the device to show what has been written. A digitizer is provided for the electronic capture of the handwritten data, and a device comprising multiple superimposed sheets, which coact to produce a visible mark when pressure is applied thereto, is placed over the digitizer to receive a writing impression at the same time that the digitizer does. A mechanical eraser is placed between the sheets to separate them and thereby erase the visible mark which has been made. The eraser also includes a sensing device to sense when an erasure has been made, and to provide a signal indicating that this has been done. In using the device, it is first ascertained that any previous marking has been erased, the desired handwritten entry is then made, and is subsequently erased, to ready the device for its next use.

9 Claims, 6 Drawing Sheets

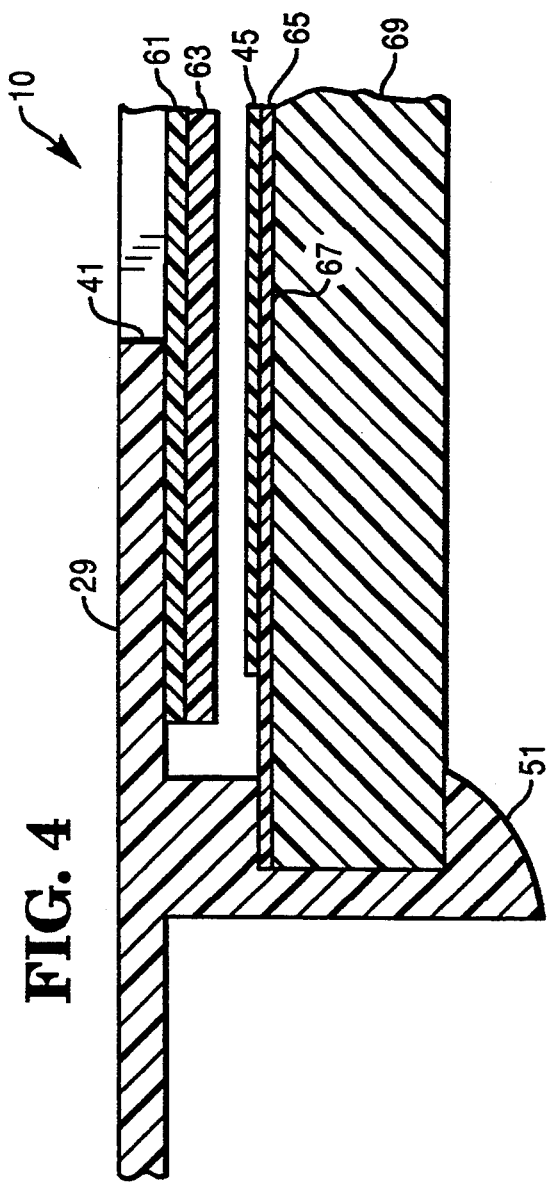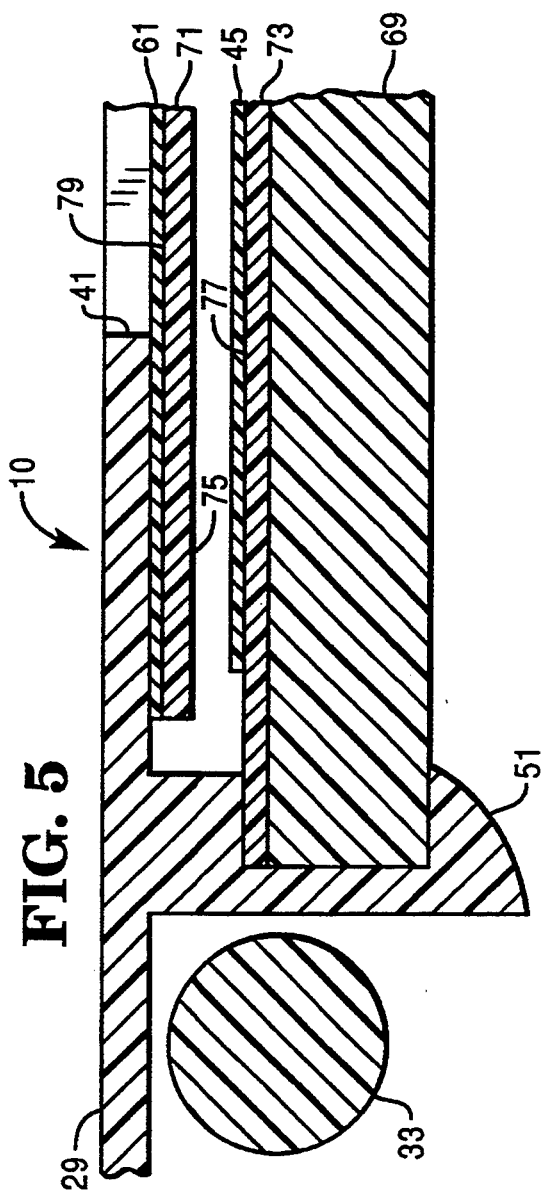

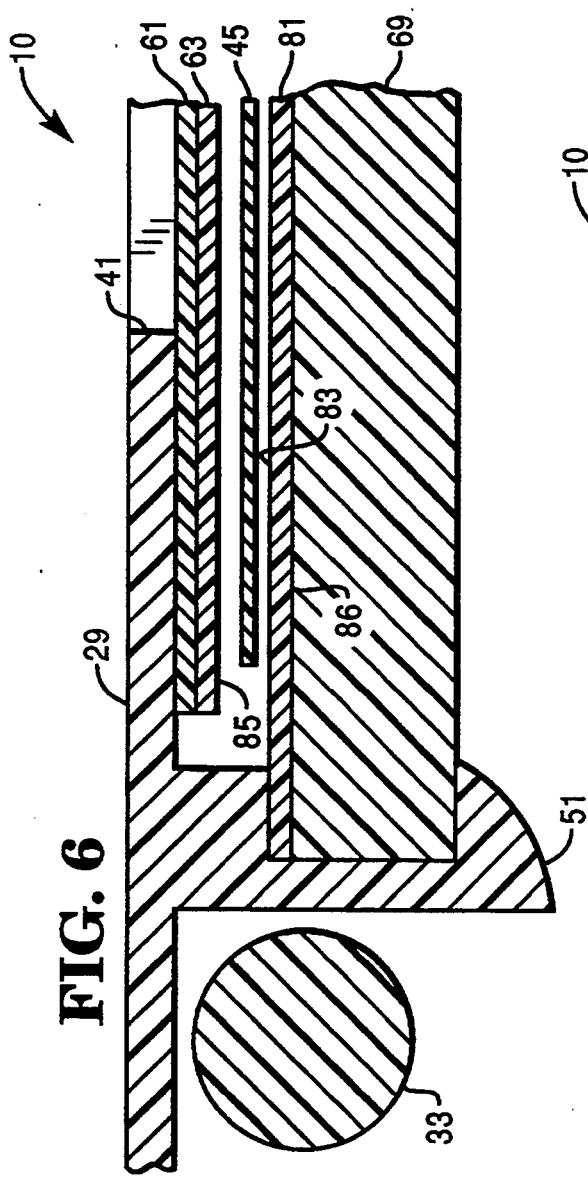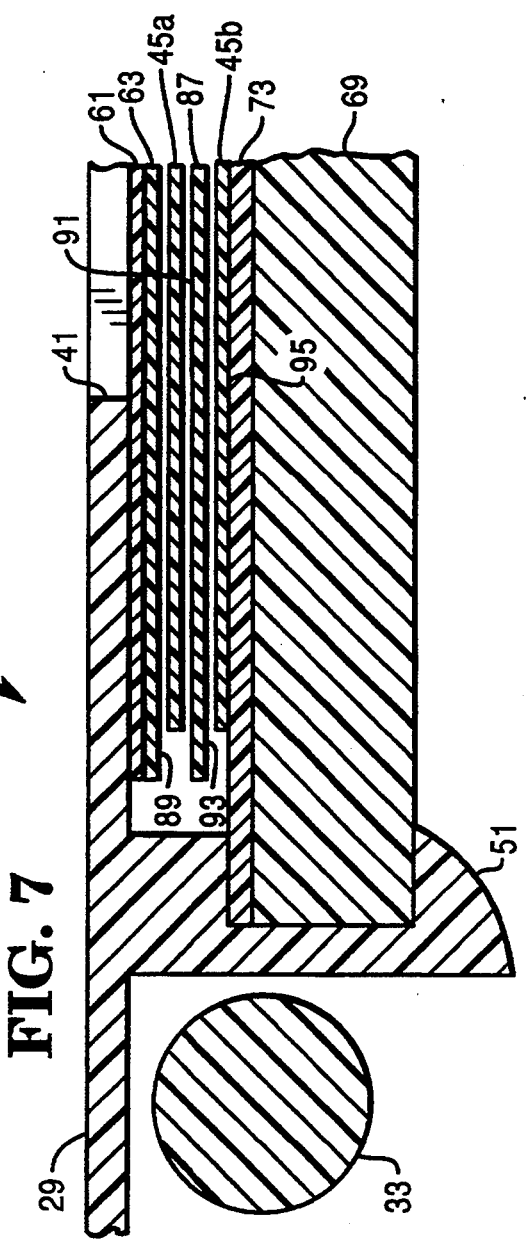

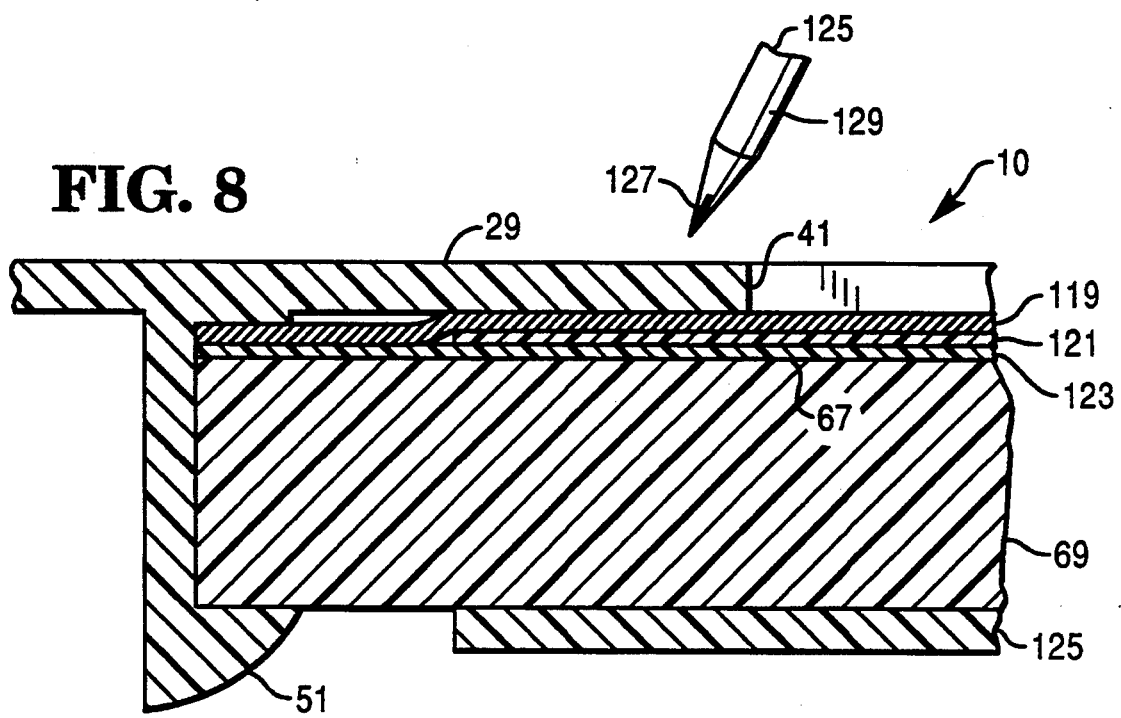

METHOD AND APPARATUS FOR CAPTURING HANDWRITTEN INFORMATION AND PROVIDING VISUAL FEEDBACK

BACKGROUND OF THE INVENTION

The present invention relates to a method and apparatus for electronically capturing handwritten information and for providing a visual feedback to the user of the apparatus for showing what has been written.

A device for electronically capturing handwritten information has wide-ranging applications. For example, in a point of sale environment, such a device can capture signatures for credit or debit payment authorization. Similarly, a banking institution can use such a device to capture signatures authorizing money withdrawals or similar transactions. In hotels, guests can enter registry information using such a device. In general, any application currently using paper forms can make use of a device for electronically capturing handwritten information.

In the past, there have been devices which have combined an electrographic digitizer with some form of user feedback mechanism. The user feedback mechanism allows a user to see what has been written. This serves three purposes. First, it enhances the analogy to writing on paper, thus making the digitizer more natural to use. Second, the user feedback mechanism allows the user to compose his or her writing so that he or she does not overwrite previous information or write the same information twice. Third, the user feedback mechanism allows the user to go back and make modifications to previous information. These modifications might include completing multiple stroke letters like i's and t's, as well as correcting mistakes.

In the past, there have been three approaches to providing user feedback: coincident electronic display, remote electronic display and paper. Coincident electronic display involves placing a transparent digitizer on top of an electronic display such as a cathode ray tube or liquid crystal display. The system includes a control means in communication with both the digitizer and the display such that wherever the user writes on the digitizer, a corresponding trail appears at the same corresponding location on the display. United States patent applications Ser. Nos. 575,096, filed Aug. 30, 1990, and 640,199, filed Jan. 11, 1991, both assigned to the assignee of the present application, and incorporated herein by reference, describe devices using this approach. Coincident display offers a good analogy to paper, but is very expensive due to the display and the associated controller required.

Remote electronic display is the same as coincident electronic display except that the digitizer is not on top of the display. The only advantage that remote display has over coincident electronic display is that the digitizer can be opaque, and opaque digitizers are generally less expensive than transparent digitizers. However, while remote electronic display is better than no feedback at all, it is generally counter-intuitive to use because it is not analogous to writing directly on paper.

Paper feedback involves placing a piece of paper on top of a digitizer and writing on the paper using a combination digitizer stylus/pen. Such a device is described in United States patent application Ser. No. 703,430, filed May 17, 1991, now U.S. Pat. No. 5,120,906, issued Jun. 9, 1992, assigned to the assignee of the present application, and incorporated herein by reference.

Paper feedback has many advantages, among them very low cost and an intuitive interface. However there are drawbacks. Loading a new piece of paper before every use is inconvenient. In signature capture applications, such as point of sale debit or credit operations, discarded paper signatures invite forgery.

It will thus be seen that a handwriting capture device which provides a low-cost, reusable, paper-like feedback mechanism would be very desirable.

Other United States patent applications which are of interest with respect to the present invention are Ser. No. 744,062, filed Aug. 12, 1991 and Ser. No. 693,822, filed Apr. 30, 1991, both assigned to the assignee of the present application, and incorporated by reference herein. In addition, United States Pat. Nos. of interest include the following: 1,631,192; 2,818,662; 2,853,830; 3,011,854; 3,152,406; 3,435,543; 3,585,735; 3,943,643; 3,982,334; 4,051,609; 4,143,472; 3,761,343; 3,894,183 and 4,011,665. Prior art devices include the Mini Glo-Doodler (trademark) paper savers Colorforms of Ramsey, N.J.; the Magic Slate (registered trademark) and Brite Writer (trademark) Magic Slate (registered trademark) paper savers from the Western Publishing Company of Racine, Wis., and the Magna Doodle (registered trademark) Magnetic Drawing Toy from Tyco Toys Inc. of Moorestown, N.J.

SUMMARY OF THE INVENTION

The present invention relates to a method and apparatus for capturing handwritten information utilizing a temporary mechanical marking device for enabling the user to see what he or she has just written. This is highly desirable in order to provide a natural "feel" for what has just been written. Previous devices of this type, if they provided user feedback, provided it in most cases using either an electronic display or paper. Electronic displays are expensive and paper is inconvenient to use. The method and apparatus of the present invention provide a convenient and inexpensive alternative.

In accordance with one embodiment of the present invention, an apparatus for capturing handwritten information electronically and for providing a visible trace of what has been written comprises: a sensing device for electronically sensing movement of a marking implement with respect to a surface of said device; and a reusable medium having self-contained marking material therein and located in operative relation to said sensing device on which a trace of handwritten information appears when said marking implement is moved with respect to said sensing device; in which the medium comprises a first sheet of flexible translucent material, a second sheet of flexible translucent material having a fluorescent dye dispersed throughout, a third sheet of opaque material, and a two-element separator having a first paddle located between the first and second sheets for separating the first and second sheets and having a second paddle located between the second and third sheets for separating the second and third sheets, after a trail has been produced on the sheets, in order to erase the trail.

In accordance with another embodiment of the present invention, a method for capturing handwritten information and providing visual feedback utilizing a host system having a keyboard, a display and a handwriting capture apparatus comprising a sensing device, a marking implement and a temporary marking device comprising at least two sheets of material placed on top of one another so that localized pressure causes selective adhesion between the two sheets at points of pressure application, causing a visible trail, comprises the following steps: (a) determining by the host system whether or not the temporary marking device has been erased from any previous use; (b) if the temporary marking device has not been erased, displaying a message on the display to prompt the operator to perform an erasure; (c) performing an erasure by moving a separator between said at least two sheets of material to cause the sheets to separate, erasing the visible trail, if this has not been done; (d) displaying a message on the display to prompt an operator to begin entering handwritten data on the handwriting capture apparatus; (e) entering handwritten data on the handwriting capture apparatus using the marking implement; (f) operating a key on the keyboard of the host system to signal completion of handwritten data; and (g) erasing the temporary marking device by moving said separator between said at least two sheets of material.

It is accordingly an object of the present invention to provide a handwriting capture device which provides an effective and relatively inexpensive visual feedback device.

It is another object of the present invention to provide a handwriting capture device which utilizes a simple, inexpensive temporary marking means for providing user feedback.

Another object of the present invention is to provide a handwriting capture device which uses a visual feedback mechanism that does not require the use of paper for the visual feedback.

Another object of the invention is to provide a method for capturing handwritten information using a device which employs a temporary mechanical marking mechanism.

With these and other objects, which will become apparent from the following description, in view, the invention includes certain novel features of construction and combinations of parts, preferred forms and embodiments of which are hereinafter described with reference to the drawings which accompany and form a part of this specification.

BRIEF DESCRIPTION OF THE DRAWINGS

FIG. 4 is a partial sectional view of one embodiment of the temporary mechanical marking means which forms a part of the handwriting capture device.

FIG. 5 is a partial sectional view of a second embodiment of the temporary marking means which forms a part of the handwriting capture device.

FIG. 6 is a partial sectional view of a third embodiment of the temporary marking means which forms a part of the handwriting capture device.

FIG. 7 is a partial sectional view of a fourth embodiment of the temporary marking means which forms a part of the handwriting capture device.

FIG. 8 is a partial sectional view of a fifth embodiment of the temporary marking means which forms a part of the handwriting capture device.

DETAILED DESCRIPTION

Figure 1:
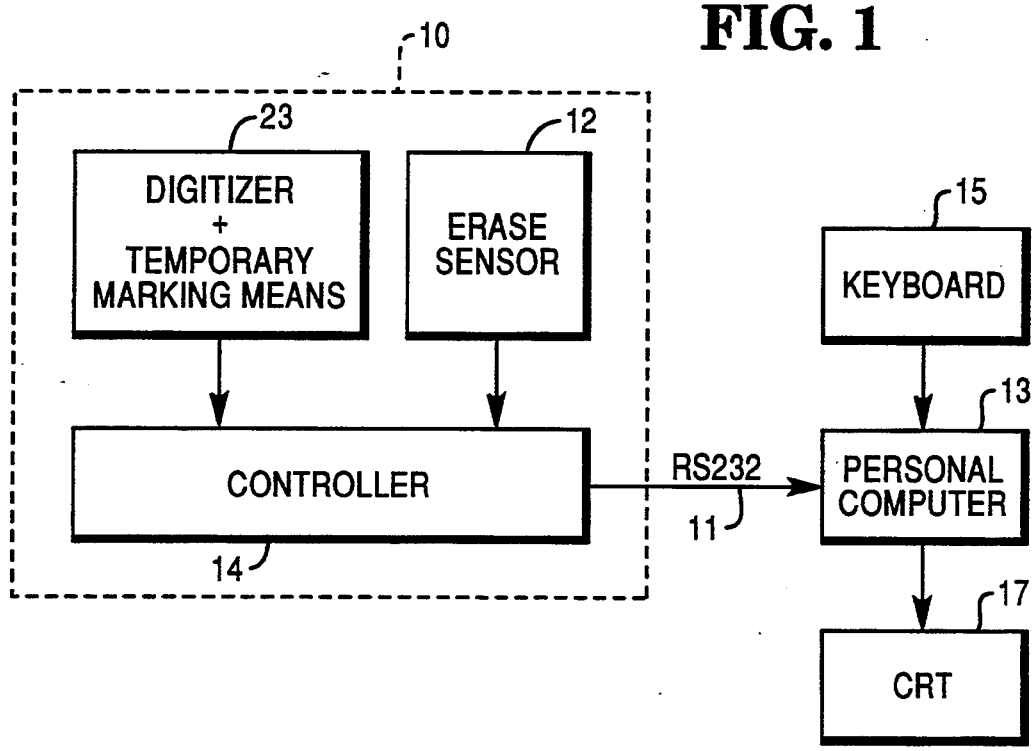
FIG. 1 is a block diagram showing a handwriting capture device connected to a host system.

Referring now to FIG. 1, shown there is a block diagram which includes a handwriting capture device 10 coupled by a link 11 to a host system which comprises a personal computer 13, having coupled thereto a keyboard 15 and a display device such as a CRT 17. The host system may optionally be an electronic point of sale system, such as a Model 7052, available from NCR Corporation, Dayton, Ohio, or any appropriate host computer. The link 11 may be in the form of a RS232 bus. As shown in FIG. 1, the handwriting capture device 10 further comprises a digitizer and a temporary marking means included in block 23, an erase sensor 12 for detecting erasure of a mark made by the temporary marking means, and a controller 14.

The controller 14 is typically a microcontroller such as the 80194 available from Intel Corporation of Santa Clara, Calif. The digitizer used in block 23 is preferably of the pressure sensitive four wire resistive type, due to its relatively low cost. Such digitizers are well-known to those versed in the art. One such digitizer is the BradyTouch (registered trademark) analog resistive touch panel, available from the W. H. Brady Co., Milwaukee, Wis. Other digitizer technologies may also be suitable for use in the present invention. Also, signatures and handwritten information need not be captured graphically. Some applications only require time and pressure information. In such a case, a piezoelectric pressure sensitive membrane could replace the digitizer which is employed in block 23. Alternatively, a pressure sensitive stylus could be used.

Figure 2:
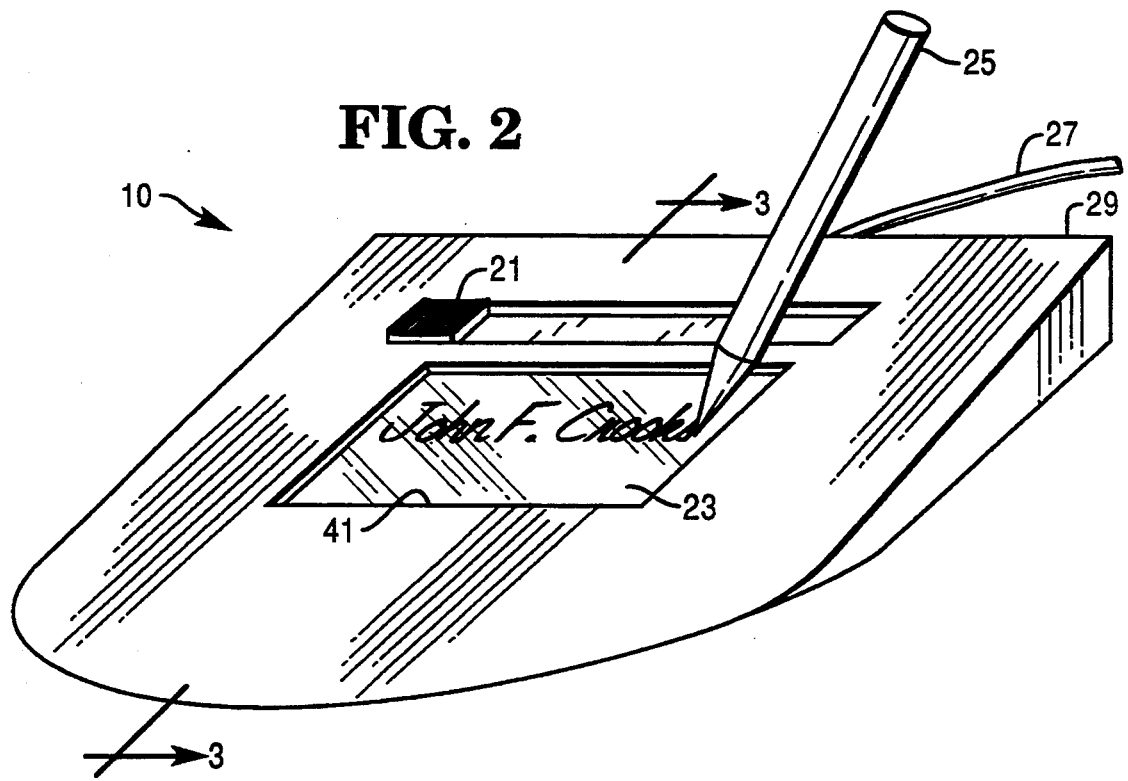
FIG. 2 is a perspective view showing the handwriting capture device with an associated marking device.

FIG. 2 shows the complete handwriting capture device 10, including erase slider 21, digitizer and temporary marking means 23, stylus 25, communications cable 27, and cabinet 29. Moving the erase slider 21 from left to right, as seen in FIG. 2, erases the temporary marking means 23. As no ink is required, the stylus 25 is preferably a simple cone-tipped cylinder of approximately the same proportions as a sharpened wood pencil. The tip should preferably be blunt so as not to harm the temporary mechanical marking means 23.

Figure 3:
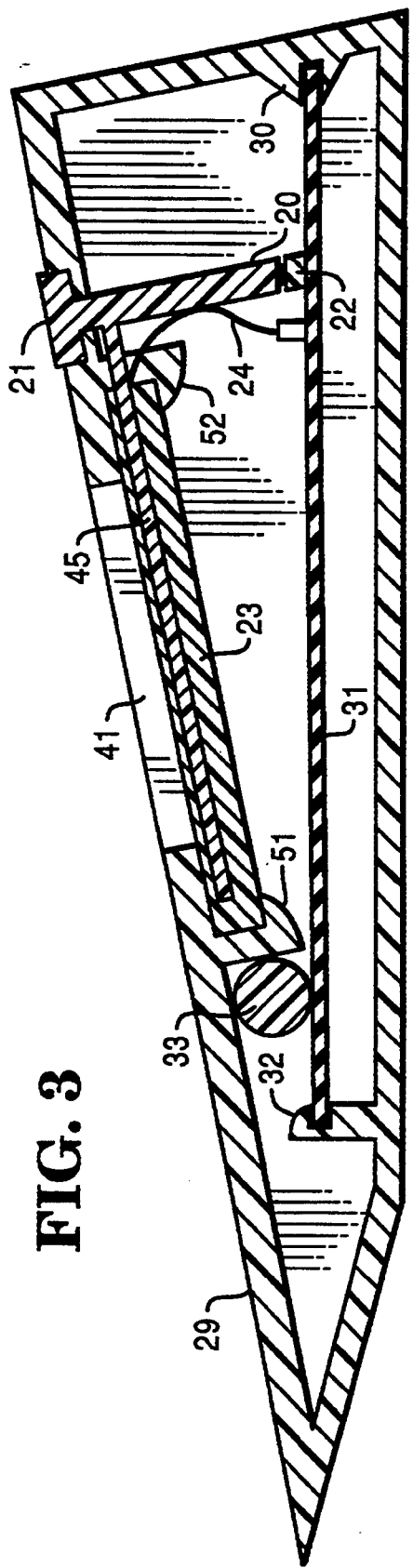
FIG. 3 is a sectional view, taken along line 3—3 of FIG. 2, of the handwriting capture device.

FIG. 3 is a sectional view taken on line 3—3 of FIG. 2, showing the cabinet 29, the erase slider 21, the erase paddle 45 attached to the erase slider 21, the digitizer and temporary marking means 23 and a controller board 31 on which the controller 14 is contained. The temporary mechanical marking means is accessible from the outside through an opening 41. Integral latches 51 and 52 hold the digitizer and temporary marking means 23 in position. Additional latches 30 and 32 retain the controller board 31 in position within the cabinet 29. A wiring harness 24 connects the digitizer and temporary marking means 23 to the controller board 31. An extension 20 of the erase slider 21 actuates a switch 22 on the controller board 31 so that the act of erasing the temporary mechanical marking means is sensed. An optional ultraviolet light source, shown here as a tube 33, enhances the operation of several embodiments of the temporary mechanical marking means, which are subsequently disclosed herein.

Five different embodiments of the temporary mechanical marking means are disclosed in the present application. Each of these is positioned on top and in alignment with the digitizer 69.

A first embodiment is disclosed in the sectional view of FIG. 4. Applied to a sensing surface 67 of the digitizer 69, which should preferably be of a dark color, such as black or blue, is a layer 65 comprising a tacky coating of transparent or translucent material, such as paraffin. Positioned above the layer 65 is a layer 63 which may comprise a sheet of flexible white translucent material. Positioned above the layer 63 is a layer 61 which comprises a protective sheet of thin semi-rigid transparent material which is exposed to the exterior of the housing 29 through the aperture 29. The thin narrow paddle 45 is mounted in the housing 29 so as to be movable from side to side between the layers 63 and 65 using the erase slider 21. Such movement separates the two layers 63 and 65 after they have been caused to adhere to each other by pressure applied by the stylus 25.

Operation of the embodiment of the temporary mechanical marking means shown in FIG. 4 is as follows. The dark digitizer surface 67 is not normally visible through the top layers 61 and 63. Pressure from the digitizer stylus 25 on the protective layer 61 forces the neighboring faces of translucent layer 63 and tacky layer 65 to adhere to each other at the point of pressure application. This adhesion leaves a dark writing trail on a white background as the digitizer surface 67 becomes visible through top layers 61 and 63.

The user erases the temporary mechanical marking means by forcing the erase paddle 45 between translucent layer 63 and tacky layer 65 to break the aforementioned adhesion. There are several alternative ways to erase the temporary mechanical marking means. For example, one could erase it by using a puff of air, as described in U.S. Pat. No. 3,943,643, inventor Fisher et al., or by shearing the two layers 63 and 65 apart, as taught in U.S. Pat. No. 3,152,406, inventor Marques.

The protective layer 61 is optional, but greatly enhances operation. First, consider the temporary mechanical marking means in FIG. 4 without the protective layer 61. During use, it is important that the edges of the translucent sheet 63 be unconstricted and free to move parallel to the tacky layer 65. Otherwise, dragging a stylus across the translucent sheet 63 toward a constricted edge would cause the translucent sheet to "bunch up" ahead of the stylus. When the user removes stylus pressure, the relaxation of the translucent sheet 63 breaks any adhesion between it and the tacky layer 65 near the constricted edge.

One alternative to leaving the translucent sheet 63 unrestricted is to make it much larger than the active area defined by the opening 41. This distributes the bunching effect over a larger area and reduces the relaxation force to the point where it will not break adhesion. Another alternative is to stretch the translucent sheet 63 taut across the opening 41. This prevents the bunching effect but also discourages adhesion between translucent layer 63 and tacky layer 65. A better alternative is to add a protective sheet 61 of thin semi-rigid transparent material such as polyester. The protective layer 61 transmits stylus force normal but not parallel to the plane of the temporary mechanical marking means, thus reducing the bunching effect. The best solution is a combination of adding the protective layer 61 and leaving the edges of the translucent sheet 63 unconstricted. The edges of the protective layer 61 can be sealed to the cabinet 29 to exclude dirt. If the protective layer 61 or the translucent layer 63 is too thick or inflexible, it will tend to distribute the stylus force over a larger area and make the written lines thicker. As this is generally undesirable, protective layer 61 and translucent layer 63 should be as thin and flexible as possible.

A second embodiment of the temporary mechanical marking means is shown in the sectional view of FIG. 5. Layer 61 is a protective sheet of thin semi-rigid transparent material. Layer 71 is a sheet of flexible translucent material such as vinyl with a fluorescent dye dispersed throughout. Layer 73 is a sheet of flexible, opaque, preferably white material, such as vinyl. Two adjacent surfaces 75 and 77, of layers 71 and 73, respectively, are very smooth. The erase paddle 45, as described above, is a thin narrow paddle which can be moved from side to side between layers 71 and 73 using erase slider 21. If desired, layer 73 could be combined into one assembly with the digitizer 69. The temporary marking means is visible through the opening 41 in the cabinet 29. The latch 51 retains the digitizer 69 in position in the cabinet 29. The ultraviolet light tube 33 may be of any suitable type, such as a model BF959-UV1, available from JKL Components Corporation of Pacoima, Calif.

Operation of the second embodiment of the temporary mechanical marking means is as follows. Incident light enters sheet 71 at its front surface 79. The fluorescent dye has the property of absorbing and then re-emitting some of this incident light at a longer wavelength which is characteristic of the dye used. Most of this re-emitted light is trapped between the front and rear surfaces 79 and 75 of sheet 71 due to internal reflection and can normally only exit through the edges of sheet 71. Because the surfaces 75 and 77 are so smooth, stylus pressure tends to make them adhere to each other. The opaque layer 73 disperses the light trapped within the translucent layer 71 at the points of adhesion, allowing the light to exit through the front surface 79 and form a luminous trail on a background which is of a similar color, but is not as luminous. The action of sliding erase paddle 45 between the layers 71 and 73 breaks all adhesion and erases the temporary mechanical marking means. The transparent protective layer 61 serves the same function as in the embodiment of FIG. 4.

The fluorescent effect is particularly strong for incident light in the ultraviolet wavelengths. While it is not required, ultraviolet lamp 33 enhances the feedback effect by injecting ultraviolet light into the edge of sheet 71 to supplement ambient light conditions. Alternatively, ultraviolet lamp 33 could be placed underneath the digitizer 69 so that its light is incident on the rear surface of layer 73, assuming that the digitizer 69 is transparent. The ultraviolet lamp 33 could also be placed on top of the cabinet 29 so that its light is incident on the front surface 79 of the sheet 43.

A third embodiment of the temporary mechanical marking means is shown in the sectional view of FIG. 6. Layer 61 is a protective sheet of thin semi-rigid transparent material. Layer 63 is a sheet of flexible white translucent material. Layer 81 is a sheet of flexible translucent material such as vinyl with a fluorescent dye dispersed throughout. Adjacent surfaces 83 and 85 of layers 81 and 63, respectively, are very smooth. The erase paddle 45 can be moved from side to side between layers 81 and 63 using erase slider 21. The top surface 85 of the digitizer 69 should have a rough texture so that the translucent fluorescent layer 81 does not adhere to it. If desired, the layer 81 and the digitizer 69 could be combined into one assembly. As in previous embodiments, the digitizer 68 is retained in the cabinet 29 by the latch 51, and an ultraviolet light tube 33 may be provided, if desired. The temporary mechanical marking means is visible through the aperture 41 in the cabinet 29.

Operation of the embodiment of FIG. 6 is similar to the operation of the embodiment of FIG. 5, described above. Incident light passes through the protective layer 61 and the translucent layer 63 and enters the fluorescent layer 81 at its front surface 87. The dye in the fluorescent layer 81 absorbs and then re-emits some of this incident radiation at a longer wavelength. This light is trapped within layer 81 due to internal reflection and can normally exit only through the edges of sheet 81. Stylus pressure forces the adjacent surfaces 85 and 83 to adhere to each other, dispersing the light trapped within layer 81 at the points of adhesion and allowing the light to exit through the front surface 83 of layer 81. This light is visible through the translucent layer 63 and appears as a luminous trail on a white background. Sliding of erase paddle 45 by a user between layers 81 and 63 breaks all adhesion and erases the temporary mechanical marking means. The transparent protective layer 61 and ultraviolet light tube 33 serve the same functions as in the previously described embodiments.

Shown in FIG. 7 is a sectional view of the fourth embodiment of the temporary mechanical marking means. This embodiment is actually a combination of the second and third embodiments shown in FIGS. 5 and 6, respectively. Layer 61 is a protective sheet of thin semi-rigid transparent material. Layer 63 is a sheet of flexible white translucent material. Layer 87 is a sheet of flexible translucent material such as vinyl with a fluorescent dye dispersed throughout. Layer 73 is a sheet of flexible opaque, preferably white, material such as vinyl. The adjacent surfaces 89 and 91 of layers 63 and 87 respectively are very smooth, as are adjacent surfaces 93 and 95 of layers 87 and 73, respectively. The erase paddles 45a and 45b are thin narrow paddles which the user may move from side to side, using the erase slider 21 shown in FIGS. 2 and 3. The digitizer 69 is retained in position in the cabinet 29 by the latch 51. An ultraviolet light tube 33 may be included in the cabinet 29, if desired. The temporary mechanical marking means is visible through aperture 41 in the cabinet 29.

Operation of the fourth embodiment shown in FIG. 7 of the temporary mechanical marking means is as follows. Incident light passes through the protective layer 61 and the translucent layer 63 and enters the fluorescent layer 87 at its front surface 91. The dye in the fluorescent layer 87 absorbs and then re-emits some of this incident light at a longer wavelength. This light is trapped within layer 87 due to internal reflection and can only exit through the edges of sheet 87. Stylus pressure forces the adjacent surfaces 89 and 91 as well as 93 and 95 to adhere to each other, dispersing the light trapped within layer 87 at the points of adhesion and allowing it to exit through the front surface 91 of layer 87. This light is visible through layers 61 and 63 and forms a bright luminous trail on a white background. This trail is brighter than in the third embodiment because light is dispersing at both the front and back surfaces 91 and 93 of fluorescent layer 87 instead of at just one surface. Sliding erase paddles 45a and 45b between layers 63, 87 and 73 breaks all adhesion and erases the temporary mechanical marking means. The transparent protective layer 61 and the ultraviolet tube 33 serve the same functions as in the previously described embodiments.

FIG. 8 shows a sectional view of the fifth embodiment of the temporary marking means. This embodiment is based upon the disclosure of U.S. Pat. No. 4,143,472, inventor Murata et al., which is incorporated by reference herein. Layer 119 is a sheet of semi-rigid transparent material such as polyester. Layer 123 is the same as layer 119 except that it need not be transparent. Interlayer 121 is a regularly spaced metal or fiber mesh impregnated with a white dispersing material mixed with a fine magnetic powder. The aforementioned U.S. Pat. No. 4,143,472 describes the construction and composition of layers 119, 121 and 123 in greater detail. The erase paddle 125 consists of a bar magnet which can be moved from side to side behind the digitizer 69 using erase slider 21. The stylus 125 is different from the stylus of the previous embodiments in that it consists of a plastic body 129 with a small magnet 127 mounted in its tip. As in previous embodiments, the digitizer 69 is retained in the cabinet 29 by the latch 51. The temporary mechanical marking means is visible through the aperture 41 in the cabinet 29.

Operation of the embodiment of FIG. 8 is as follows. Writing on the transparent substrate 119 with the magnet tipped stylus 125 brings the fine grains of magnetic powder in the interlayer 121 up to the visible writing surface. This creates a dark writing trail on a white background. Wiping bar magnet erase paddle 125 across the opposite surface of the assembly erases the feedback mechanism by moving the magnetic powder away from the visible surface.

Each embodiment of the temporary mechanical marking means has its advantages and disadvantages. The first embodiment of FIG. 4 offers the best adhesion between layers and is thus more immune to accidental separation and partial erasure. However it is also less durable, as the tacky coating or layer 65 tends to wear away with use. The second, third and fourth embodiments of FIGS. 5, 6 and 7 offer a brighter display. The second embodiment has the brightest display with its neon trail on a similarly colored but darker background. The third embodiment offers a less bright but more pleasant neon trail on a white background. The fourth embodiment is a compromise between the second and third embodiments. The fifth embodiment is more expensive to construct and is not as bright, but it is much more durable than the other embodiments.

Figure 9:
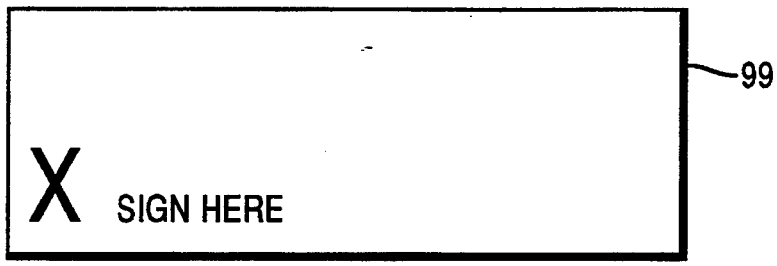
FIG. 9 shows a form which can be printed on one element of the temporary marking means.

A preprinted form may be included within the temporary mechanical marking means in any of the above embodiments. For example, the form 99 shown in FIG. 9 could be printed on the rear surface of layer 61. Alternatively, the preprinted form could be included as an additional transparent layer within the temporary mechanical marking means. Such a preprinted form would be useful for customizing the unit 10 with a store logo, including user instructions, as shown in FIG. 9, or in presenting complete "fill-in-the blank" forms.

If desired, the temporary mechanical marking means could also be made replaceable. In heavy use applications, the temporary mechanical marking means could tend to wear out.

Figure 10:
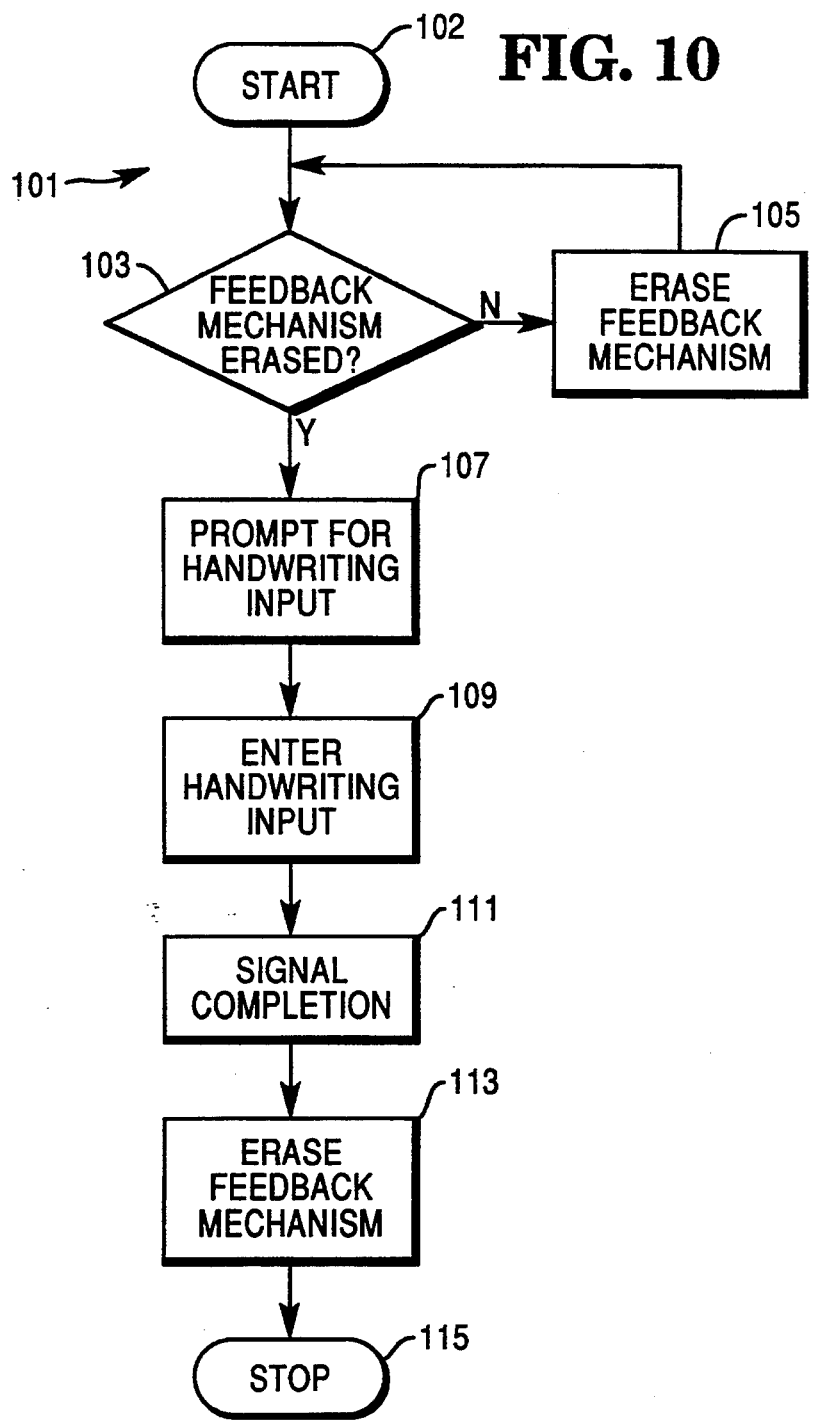
FIG. 10 is a flow diagram showing one manner in which the handwriting capture device of the present invention can be used.

Shown in FIG. 10 is a flowchart of a procedure for capturing handwriting using the device 10 shown in FIG. 1. The following description of the procedure 101 contemplates the participation of an operator who is managing the host system 13 and a user who is entering the handwritten information on the handwriting capture device 10, although the operator and the user could be one and the same. The procedure 101 starts at block 102, continuing to decision block 103 where the host system checks the handwriting capture unit 10 via RS232 link 11 to see whether or not the temporary mechanical marking means has been erased since the last use. If the temporary mechanical marking means has not been erased, the procedure 101 continues to block 105, where the host system prompts the operator to erase the temporary mechanical marking means. This prompting preferably comes in the form of a message on the host system display 17. The procedure then returns to decision block 103.

If the host system 13 determines, in decision block 103, that the temporary mechanical marking means has been erased, the procedure continues to block 107 where the host system 13 prompts the operator, who in turn prompts the user, to begin entering handwriting input on the handwriting capture device 10. This prompting preferably comes in the form of a message on the host system display 17. Alternatively, it could come from a LED (light emitting diode) on the handwriting capture device 10, but this adds unneeded cost and possible user confusion.

The procedure then continues to block 109, where the user enters handwriting input on the digitizer/temporary mechanical marking means 23. The controller 14 simultaneously streams handwriting positional data from the digitizer/temporary mechanical marking means 23 to the host system 13 via RS232 link 11. Following this, the user signals that he has completed handwriting input in block 111. This signal could come in one of two forms. In one form, the user signals the operator that he is finished. The operator then signals the host system 13 by depressing a key on the keyboard 15 of the host system. In another form, the user signals completion of his writing by erasing the temporary mechanical marking means, as shown in block 113. The host system senses this via RS232 link 11. The procedure is thus completed, and stops, as indicated in block 115.

While the forms of the invention shown and described herein are admirably adapted to fulfill the objects primarily stated, it is to be understood that it is not intended to confine the invention to the forms or embodiments disclosed herein, for it is susceptible of embodiment in various forms within the scope of the appended claims.

What is claimed is:

1. An apparatus for capturing handwritten information electronically and for providing a visible trace of what has been written, comprising:
   a housing;
   a sensing device within the housing for electronically sensing movement of a marking implement with respect to a surface of said device; and
   a reusable medium having self-contained marking material therein and located in operative relation to said sensing device on which a trace of handwritten information appears when said marking implement is moved with respect to said sensing device;
   said medium comprising at least two sheets of material placed on top of one another so that localized pressure causes selective adhesion between the two sheets at the points of pressure application, causing a visible trail;
   said medium also including a separator for separating the two sheets after a visible trail has been produced on the sheets, to erase the trail, said separator having an extension for actuating a switch when operated to indicate that an erasing operation has taken place;
   a first of said sheets comprising a flexible translucent sheet having a fluorescent dye dispersed throughout and a second sheet comprising an opaque sheet;
   said apparatus also including an ultraviolet light source located within said housing.

2. The apparatus of claim 1, in which a surface of the sensing device is rough and the second sheet is positioned adjacent to said surface.

3. An apparatus for capturing handwritten information electronically and for providing a visible trace of what has been written, comprising:
   a sensing device for electronically sensing movement of a marking implement with respect to a surface of said device; and
   a reusable medium having self-contained marking material therein and located in operative relation to said sensing device on which a trace of handwritten information appears when said marking implement is moved with respect to said sensing device;
   in which the medium comprises a first sheet of flexible translucent material, a second sheet of flexible translucent material having a fluorescent dye dispersed throughout, a third sheet of opaque material, and a two-element separator having a first paddle located between the first and second sheets for separating the first and second sheets and having a second paddle located between the second and third sheets for separating the second and third sheets, after a trail has been produced on the sheets, in order to erase the trail.

4. The apparatus of claim 3, also including an additional protective layer positioned above said other layers, the marking implement being engageable with said additional protective layer during writing on the apparatus.

5. Apparatus for capturing handwritten information, comprising:
   a temporary mechanical marking means;
   a handwriting sensing device positioned in operative relation to said temporary mechanical marking means;
   a controller; and
   a communications interface coupled to said controller and said handwriting sensing device;
   the temporary mechanical marking means comprising three layers of material, a first of said layers comprising a first sheet of flexible translucent material, a second of said layers comprising a sheet of flexible translucent material having a fluorescent dye dispersed throughout, and a third layer comprising a sheet of opaque material, and a two-element separator having a first paddle located between the first and second layers for separating the first and second layers and having a second paddle located between the second and third layers for separating the second and third layers.

6. The apparatus of claim 5, also including an additional protective layer positioned above said other layers.

7. The apparatus of claim 5, in which the temporary mechanical marking means has indicia placed thereon.

8. The apparatus of claim 7, in which the indicia comprises a business form.

9. A method for capturing handwritten information and providing visual feedback utilizing a host system having a keyboard, a display and a handwriting capture apparatus comprising a sensing device, a marking implement and a temporary marking device comprising at least two sheets of material placed on top of one another so that localized pressure causes selective adhesion between the two sheets at points of pressure application, causing a visible trail, comprising the following steps:

(a) determining by the host system whether or not the temporary marking device has been erased from any previous use;

(b) if the temporary marking device has not been erased, displaying a message on the display to prompt the operator to perform an erasure;

(c) performing an erasure by moving a separator between said at least two sheets of material to cause the sheets to separate, erasing the visible trail, if this has not been done;

(d) displaying a message on the display to prompt an operator to begin entering handwritten data on the handwriting capture apparatus;

(e) entering handwritten data on the handwriting capture apparatus using the marking implement;

(f) operating a key on the keyboard of the host system to signal completion of handwritten data; and (g) erasing the temporary marking device by moving said separator between said at least two sheets of material.

* * * * *